United States Patent
Liu et al.

(10) Patent No.: US 10,691,504 B2
(45) Date of Patent: Jun. 23, 2020

(54) CONTAINER BASED SERVICE MANAGEMENT

(71) Applicant: INTERNATIONAL BUSINESS MACHINES CORPORATION, Armonk, NY (US)

(72) Inventors: Xin Peng Liu, Beijing (CN); Ying Mao, Beijing (CN); Kun Yang, Beijing (CN); Jing You, Beijing (CN); Wu Mi Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/675,828

(22) Filed: Aug. 14, 2017

(65) Prior Publication Data

US 2019/0050272 A1    Feb. 14, 2019

(51) Int. Cl.
| | |
|---|---|
| G06F 9/50 | (2006.01) |
| H04L 12/24 | (2006.01) |
| G06F 9/455 | (2018.01) |
| H04L 12/26 | (2006.01) |

(52) U.S. Cl.
CPC ............ G06F 9/5088 (2013.01); G06F 9/455 (2013.01); G06F 9/45558 (2013.01); G06F 9/505 (2013.01); H04L 41/0836 (2013.01); H04L 41/5025 (2013.01); G06F 2009/4557 (2013.01); H04L 43/0817 (2013.01)

(58) Field of Classification Search
None
See application file for complete search history.

(56) References Cited

U.S. PATENT DOCUMENTS

| | | | |
|---|---|---|---|
| 8,069,218 B1 * | 11/2011 | Tormasov | G06F 9/4856 709/212 |
| 8,478,725 B2 | 7/2013 | Mashtizadeh et al. | |
| 8,671,238 B2 | 3/2014 | Mashtizadeh et al. | |

(Continued)

FOREIGN PATENT DOCUMENTS

| | | |
|---|---|---|
| CN | 105607954 A | 5/2016 |
| WO | 2015197564 A1 | 12/2015 |

OTHER PUBLICATIONS

Amazon, "Tutorial: Scaling Container Instances with CloudWatch Alarms," Amazon EC2 Container Service Developer Guide, Nov. 13, 2014, p. 183-187, Amazon Web Services, Inc.

(Continued)

*Primary Examiner* — Nicholas R Taylor
*Assistant Examiner* — Tania M Pena-Santana
(74) *Attorney, Agent, or Firm* — Richard A. Wilhelm

(57) ABSTRACT

A method, computer system, and a computer program product for migrating a service from one container to another container is provided. The present invention may include obtaining a first group of requests that are accessing a service launched in a first container instance and a second group of requests that are waiting for accessing the service. The present invention may also include generating a migrated service in a second container instance by migrating the service from the first container instance to the second container instance based on the obtained first and second groups of requests. The present invention may further include directing the second group of requests to the migrated service in the second container instance.

20 Claims, 5 Drawing Sheets

(56) References Cited

U.S. PATENT DOCUMENTS

| | | |
|---|---|---|
| 8,978,035 B2 | 3/2015 | McGrath et al. |
| 9,104,460 B2 | 4/2015 | Jansen |
| 2001/0037371 A1* | 11/2001 | Ohran .................. G06F 3/0601 709/214 |
| 2006/0059228 A1* | 3/2006 | Kasamsetty .......... G06F 9/5088 709/203 |
| 2008/0059639 A1* | 3/2008 | Zhang .................. G06F 9/5083 709/227 |
| 2008/0155208 A1* | 6/2008 | Hiltgen ............... G06F 9/45533 711/154 |
| 2010/0297238 A1* | 11/2010 | Kiick .................. A61K 9/0092 424/486 |
| 2014/0137125 A1* | 5/2014 | Hsu ...................... G06F 9/4856 718/102 |
| 2016/0098302 A1 | 4/2016 | Ben-Yehuda et al. |
| 2016/0134557 A1 | 5/2016 | Steinder et al. |
| 2016/0205518 A1 | 7/2016 | Patel et al. |
| 2016/0330277 A1 | 11/2016 | Jain et al. |
| 2016/0342801 A1* | 11/2016 | Sreekanti ............ G06F 21/6209 |

OTHER PUBLICATIONS

Anonymous, "A Method and System for Recommending Patches to Customers," An IP.com Prior Art Database Technical Disclosure, Dec. 28, 2016, p. 1-3, IP.com Number: IPCOM000248708D.

Goldman et al., "What is the Best Way to Monitor an Application that is Running Inside a Docker Container?," Quora, Jul. 29, 2016, p. 1-6, https://www.quora.com/What-is-the-best-way-to-monitor-an-application-that-is-running-inside-a-docker-container, Accessed on Aug. 8, 2017.

Mell et al., "The NIST Definition of Cloud Computing," National Institute of Standards and Technology, Sep. 2011, p. 1-3, Special Publication 800-145.

Synytsky, "Containers Live Migration: Behind the Scenes," InfoQ Articles, Jul. 22, 2016, p. 1-6, C4Media Inc., https://www.infoq.com/articles/container-live-migration, Accessed on Aug. 8, 2017.

\* cited by examiner

CONTAINER BASED SERVICE MANAGEMENT

BACKGROUND

The present disclosure generally relates to provision of computer service. Specifically, implementations of the present disclosure relate to methods, systems and computer program product for migrating a service from one container to another container.

Modern computing systems are getting increasingly large and complex, such that these systems often provide multiple services and support concurrent access by a large number of requests by users. Usually, a service may be provided in one or more computing devices (physical devices and/or virtual devices) and this service may be continuously accessed by requests from various applications. Sometimes, this service needs to be migrated from one computing device to another due to a heavy workload of the device or another situation. As some requests are accessing the service and some requests are waiting for accessing the service, this service cannot be shut down for the migration. Otherwise, if the service is shut down, then the information about all the above requests will be lost and cannot be recovered. At this point, how to migrate an active service to a target computing device and reduce the shut down time of the service becomes a focus in the art.

SUMMARY

In one aspect, a computer-implemented method for migrating a service from one container to another container is disclosed. According to the method, a first group of requests that are accessing a service launched in a first container instance and a second group of requests that are waiting for access the service are obtained. A migrated service in a second container instance is generated by migrating the service from the first container instance to the second container instance based on the obtained first and second groups of requests. The second group of requests is directed to the migrated service in the second container instance.

In another aspect, a computing system for migrating a service from one container to another container is disclosed. The computing system comprises one or more computer processors coupled to one or more computer-readable memory units, where the memory unit comprises instructions that when executed by the computer processor implements a method. According to the method, a first group of requests that are accessing a service launched in a first container instance and a second group of requests that are waiting for access the service are obtained. A migrated service in a second container instance is generated by migrating the service from the first container instance to the second container instance based on the obtained first and second groups of requests. The second group of requests is directed to the migrated service in the second container instance.

In another aspect, a computer program product for migrating a service from one container to another container is disclosed. The computer program product is one or more computer-readable storage media and program instructions stored on at least one of the one or more tangible storage media. When the instructions are executed on an electronic device, the electronic device is caused to: obtain a first group of requests that are accessing a service launched in a first container instance and a second group of requests that are waiting for accessing the service; generate a migrated service in a second container instance by migrating the service from the first container instance to the second container instance based on the obtained first and second groups of requests; and direct the second group of requests to the migrated service in the second container instance.

It is to be understood that the Summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some implementations of the present disclosure in the accompanying drawings, the above and other objects, features and advantages of the present disclosure will become more apparent, wherein.

Throughout the drawings, same or similar reference numerals represent the same or similar elements.

DETAILED DESCRIPTION

Figure 1:
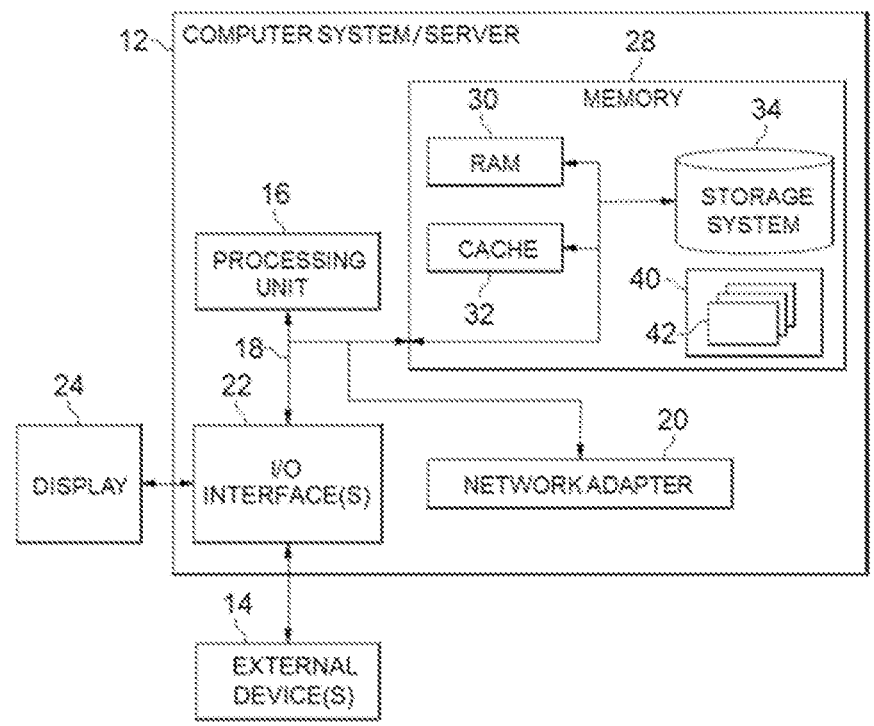
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
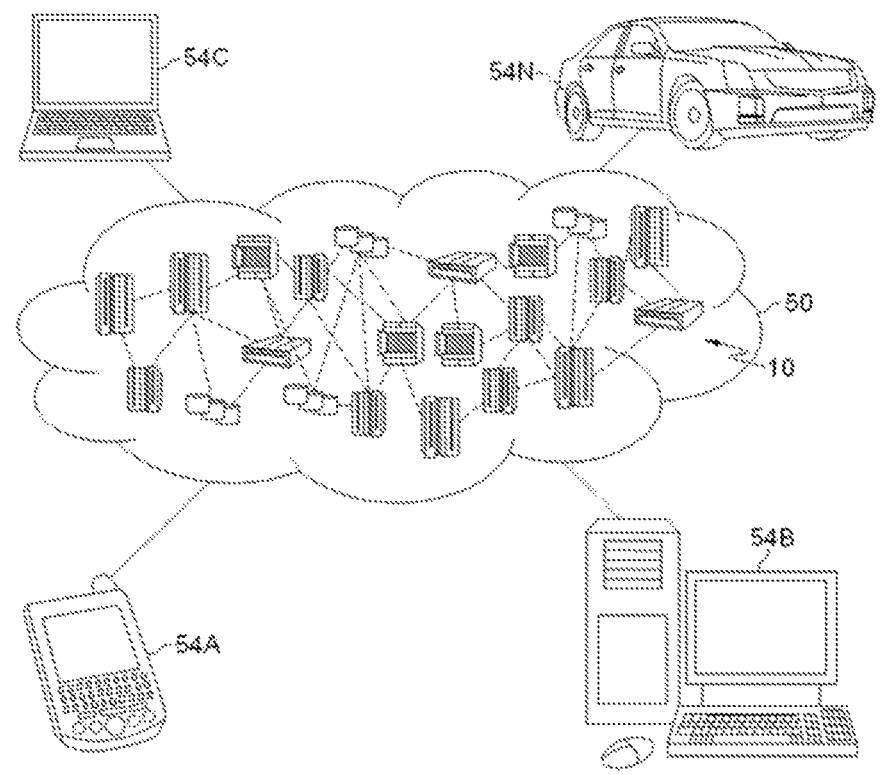
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
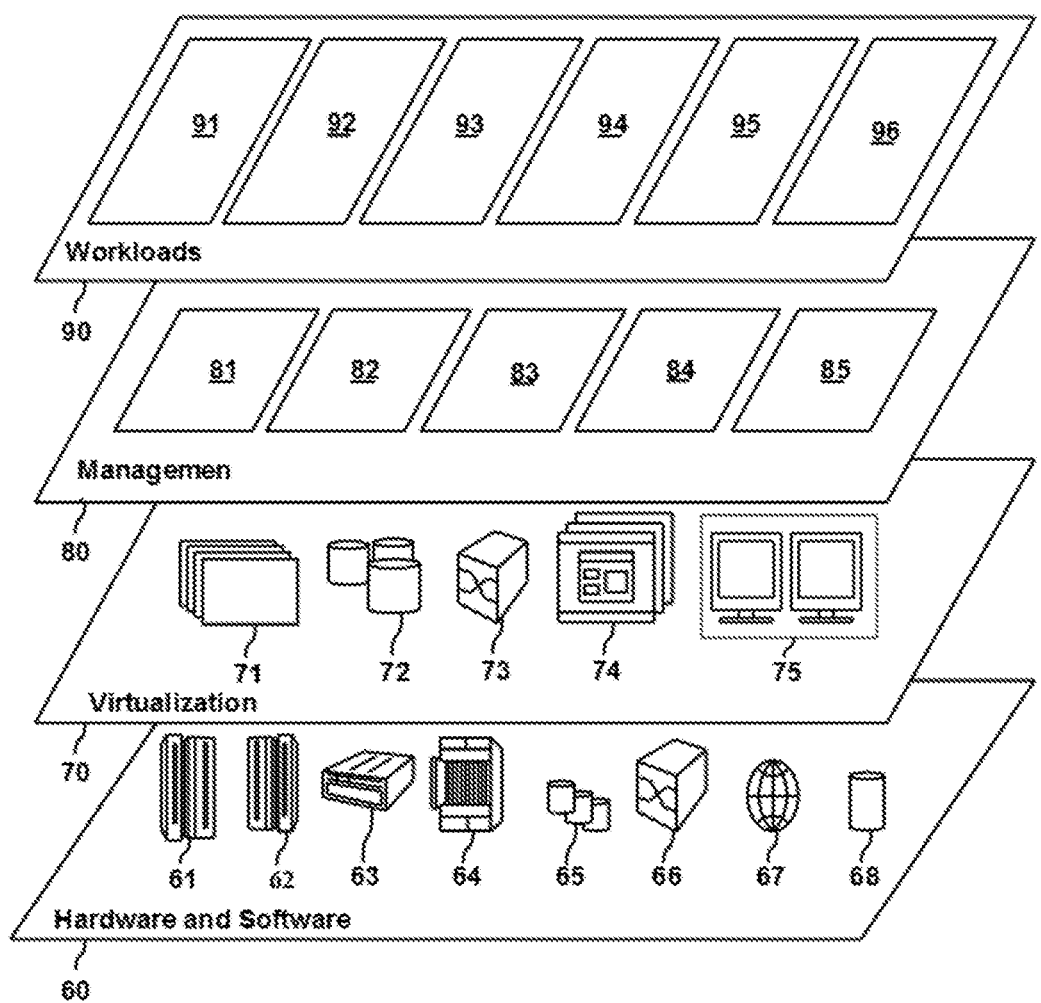
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service processing 96. The service processing 96 may implement the solution for service management.

For the purpose of description, detailed description will be presented to various implementations of the present disclosure in the cloud environment, where a container cluster may be deployed in the cloud environment and provide services to various applications.

In the context of the present disclosures, a service refers to a process, launched in a device, for providing an intended result in response to receiving a request for example from an application. For example, a temperature service may provide the temperature at a location and a time point as specified in the request. In another example, an air quality service may provide the PM 2.5 value at a location and a time point as specified in the request.

A container refers to a device for hosting one or more services. In one situation, the container may be implemented by a physical computing device such as a computer; alternatively, the container may be implemented by a virtual machine. The container may be provided in the cloud environment. Once the container has been started up and launched the services, the container may be referred to as a container instance.

A container cluster refers to a group of container instances. Usually, the container cluster may include one or more common container instances for hosting the services and at least one management container instance for managing the cluster as a leader. The container cluster is the foundation for the services and it may be implemented in a common cluster structure or in the cloud environment.

Figure 4:
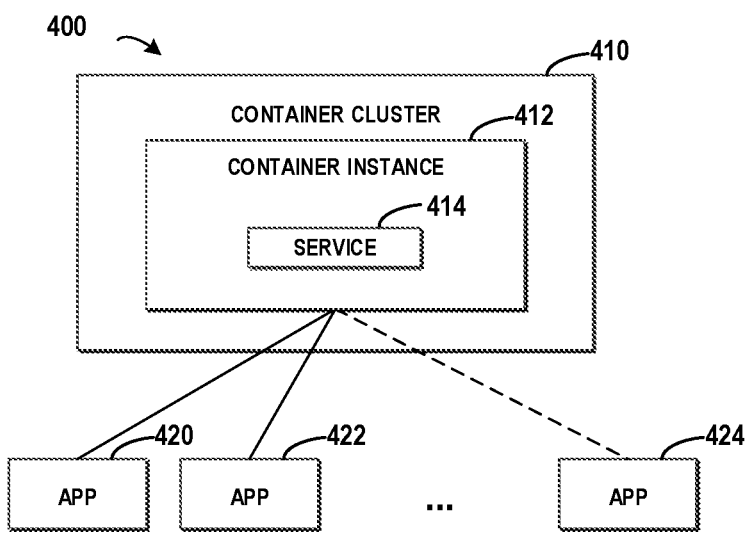
FIG. 4 depicts a diagram for managing a service launched in a container instance according to an approach.

FIG. 4 depicts a diagram 400 for managing a service launched in a container instance according to an approach. As depicted in FIG. 4, a container cluster 410 may include a container instance 412, where a service 414 is launched in the container instance 412. A plurality of applications such as applications 420, 422, and 424 may connect to the container instance 412 and send requests for accessing the service 414. Although only one container instance 412 is depicted, the container cluster 410 may include more container instances. Further, although only one service 414 is depicted in the container instance 412, there may be more services launched in the container instance 412. In the approach of FIG. 4, the container instance 412 may be implemented by a computing device, the service 414 may be a temperature service, and the applications 420, 422, and 424 may be weather forecast applications installed in the user devices such as smart phones or other type of computing device.

Service migration may occur under several situations. In the context of the present disclosure, migrating a service refers to moving the data related to the service from a source container to a destination container. During the migration, the related data may be gradually copied from the source container to the destination container. After the service has been completed copied to destination container, the related data in the source container may be removed.

During the operation of the container cluster 410, there may be a requirement for migrating the service 414 from the container instance 412 to another container instance. In one situation, the data center for hosting the container cluster 410 may be updated and old devices in the data center should be replaced with new ones. At this point, the services launched in the old devices should be migrated to the new devices. In another situation, resources in the container instance 412 may be exhausted and the applications 420, 422, 424 have to wait a long time for the query result. Considering the resource shortage in the container instance 412, some of the services launched in the container instance 412 should be migrated to another container instance to relieve the resource stress.

Some approaches have been proposed to perform the service migration. However, these approaches cannot achieve on-line service migration and the to-be-migrated service should be shut down, which introduces interruption to the on-line services. Specifically, the applications 420, 422, and 424 directly connect to the container instance 412, and the connections between a respective one in the applications and the container instance 412 will be lost during the migration. Further, after the service 414 is migrated to another container instance, the migrated service cannot recover the lost connections and the applications that lost connections with the service 414 have to resend new requests to the migrated service.

In order to at least partially solve the above and other potential problems, a new method and system for service management are disclosed herein. According to implementations of the present disclosure, a method is disclosed. In the method, a first group of requests that are accessing a service launched in a first container instance and a second group of requests that are waiting for accessing the service are obtained. A migrated service in a second container instance is generated by migrating the service from the first container instance to the second container instance based on the obtained first and second groups of requests. The second group of requests is redirected to the migrated service in the second container instance.

Figure 5:
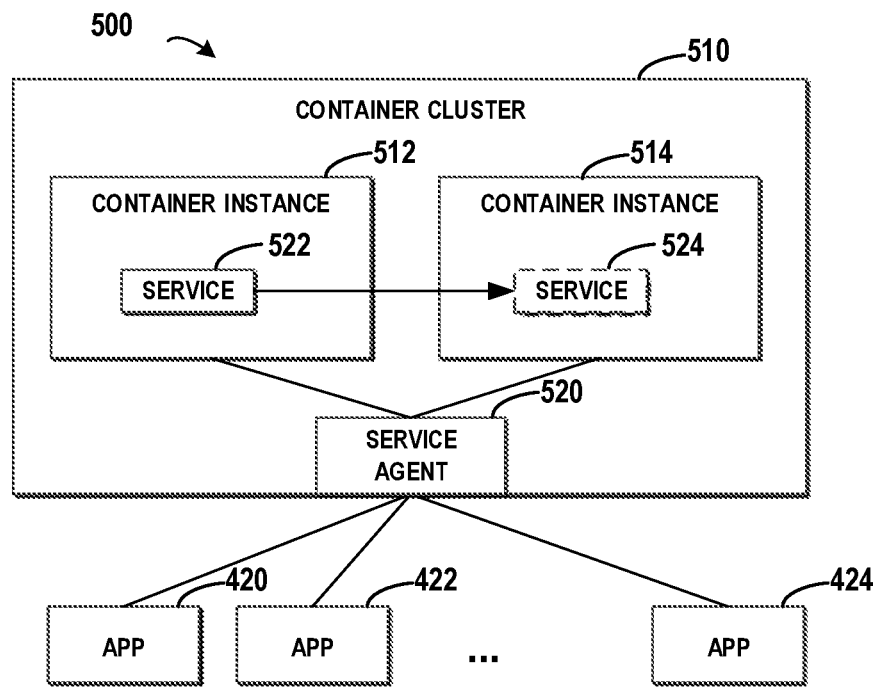
FIG. 5 depicts a diagram for managing a service launched in a container instance according to one implementation of the present disclosure.

FIG. 5 depicts a diagram 500 for managing a service launched in a container instance according to one implementation of the present disclosure. As depicted in FIG. 5, a service agent 520 is deployed for managing the requests from the various applications 420, 422, and 424. The information of these requests (including the first group of requests that are accessing the service 522 and the second group of requests that are waiting for accessing the service 522) may be obtained. Based on the obtained information of the requests, the service 522 may be migrated from the container instance 512 to the container instance 514 to generate a migrated service 524. As the service agent 520 records the information of the requests from the applications 420, 422, and 424, the requests that are waiting for accessing the service 522 may be directed to the migrated service 524 after the service migration.

With the above implementation, the service 522 remains active and may be accessed by the first group of requests during the migration. After the migration, the second group of requests may be directed to the migrated service 524 without a new request being resent from the application. At this point, the shut down time of the service may be reduced and thus the container cluster 510 may provide the service without interruption.

Figure 6:
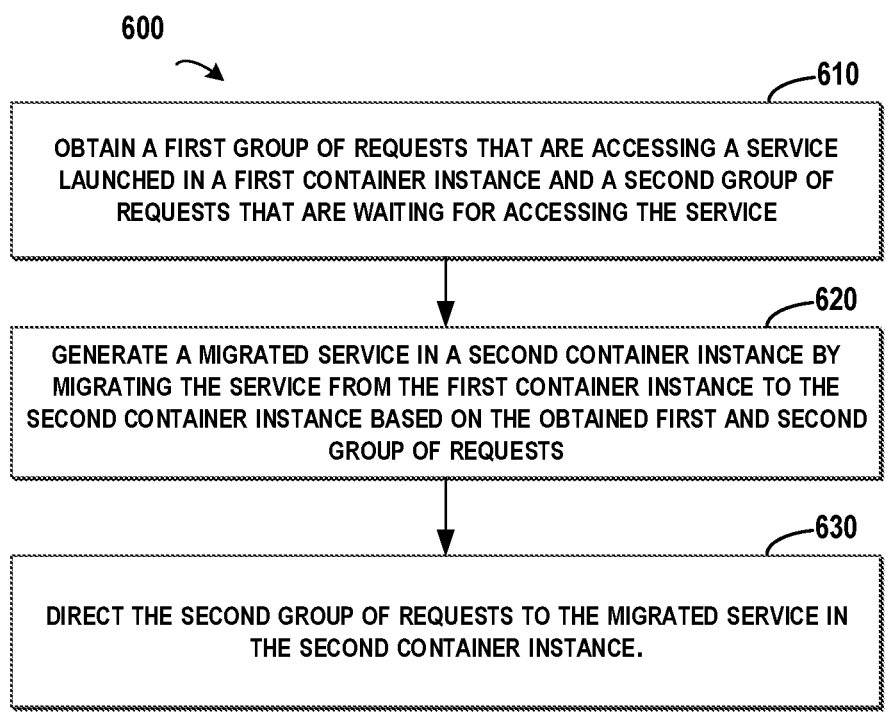
FIG. 6 depicts a flowchart of a method for managing a service according to one implementation of the present disclosure.

FIG. 6 depicts a flowchart of a method 600 for managing a service according to one implementation of the present disclosure. At 610, a first group of requests that are accessing a service launched in a first container instance and a second group of requests that are waiting for accessing the service are obtained. During the operation of the service 522, multiple requests may be received at the container instance 512. Depending on the workload of the service 522 and the chronological order of these received requests, some of the requests may immediately access the service 522, and some of the requests have to wait for their turn for accessing the request.

In one implementation, multiple threads may be initiated in the service 522 and provide multiple accessing paths to multiple requests. For example, two threads may be initiated in the service 522 and thus the first two requests may access the service 522 concurrently. However, the other requests have to wait for accessing the service 522. At this point, information of the requests (such as which request(s) is accessing the service 522 and which request(s) is waiting for accessing the service 522) may be obtained at 610.

At 620, a migrated service 524 is generated in a second container instance 514 by migrating the service 522 from the first container instance 512 to the second container instance 514 based on the obtained first and second groups of requests. As the first and second groups identify the connection state of the container instance 512 with the applications 420, 422, and 424, the service 522 launched in the container instance 512 may be migrated based on the first and second groups.

Generally, rules for the service migration are: 1) if the service has already started to serve a given request and the given request is accessing the service, then the given request may continue the access during the migration; 2) if a given request is waiting for accessing the service, then the given request may be held for some time during the migration. Based on the above rules, the first group of requests may continue accessing the service 522 and the second group of requests may be held until the migration is complete. Details of the migration will be described with reference to FIGS. 7, 8A, 8B, and 9 in the following paragraphs.

At 630, the second group of requests is directed to the migrated service in the second container instance. After the service 522 is migrated from the container instance 512 to the container instance 514, the second group of requests may be directed to and served by the migrated service 524. At this point, the second group of requests are recovered from the holding state.

In some implementations of the present disclosure, the method 600 depicted in FIG. 6 may be triggered according to various situations. In one implementation, the method 600 may be triggered in response to detecting a workload associated with the service being above a threshold. At this point, migrating the service to another container instance may decrease the workload in the original container instance. In another implementation, the migration may be triggered in response to receiving a migrating command. Although the present disclosure describes the above two situations that may trigger the migration, the method 600 may be implemented based on another specific requirement.

Figure 7:
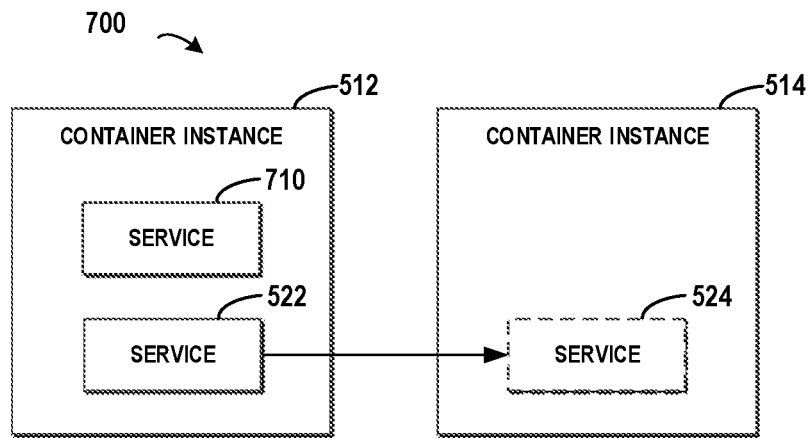
FIG. 7 depicts a diagram for migrating a service launched in a first container instance to a second container instance according to one implementation of the present disclosure.

FIG. 7 depicts a diagram 700 for migrating a service launched in a first container instance to a second container instance according to one implementation of the present disclosure. In FIG. 7, two services 710 and 522 are launched in the container instance 512 and the implementation is described in a situation where the workload associated with the service 522 is heavy and the service 522 should be migrated to the container instance 514.

In some implementations of the present disclosure, a workload of a resource in the first container instance in which the service is launched may be monitored. In the context of the present disclosure, the resource may refer to various resources that may affect the speed of accessing the service by the request. For example, the resource may include the memory resource, the computing resource such as CPU (Central Processing Unit) in the container instance, and the like. Referring to FIG. 7, it may be defined that if the usage of the memory/CPU in the container instance 512 reaches a threshold such as 90%, then the related service 522 should be migrated to the container instance 514.

In some implementations of the present disclosure, a workload of a resource occupied by the service in the first container instance may be monitored. The migration rule may define that if the usage of the memory/CPU occupied by the service 522 reaches a predefined threshold, then the service 522 should be migrated to the container instance 514.

The following paragraphs will describe the details for the service migration. In some implementations of the present disclosure, in order to migrate the service based on the obtained first and second groups of requests, the second group of requests may be suspended. It is to be understood that only the second group of requests are suspended and the first group of requests may continue to access the service. Next, data associated with the service may be copied from the first container instance to the second container instance without suspending the first group of requests. Referring to FIG. 7, the first and second groups of requests are connecting to the container instance 512. In this situation, the second group of requests may be suspended, and the first group of requests may continue accessing the service 522 during copying the service 522 from the container instance 512 to the container instance 514 to generate a migrated service 524.

Figure 8A:
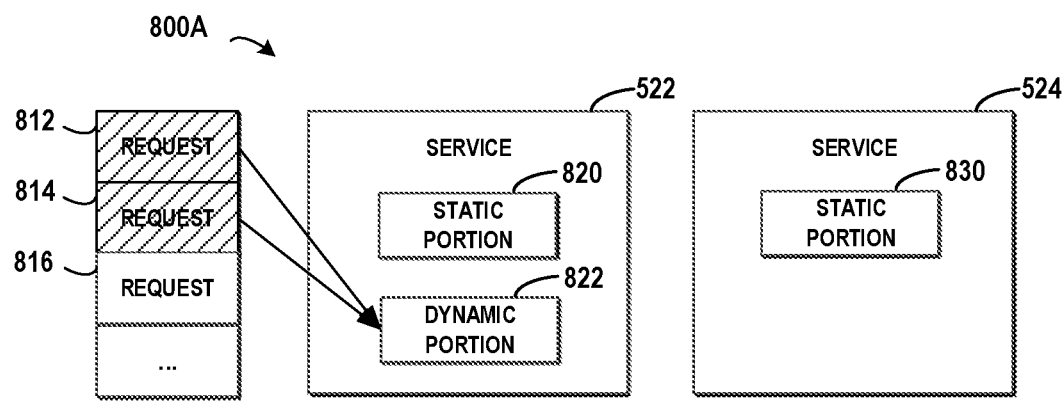
FIG. 8A depicts a diagram for migrating a static portion of a service launched in a first container instance to a second container instance according to one implementation of the present disclosure.
Figure 8B:
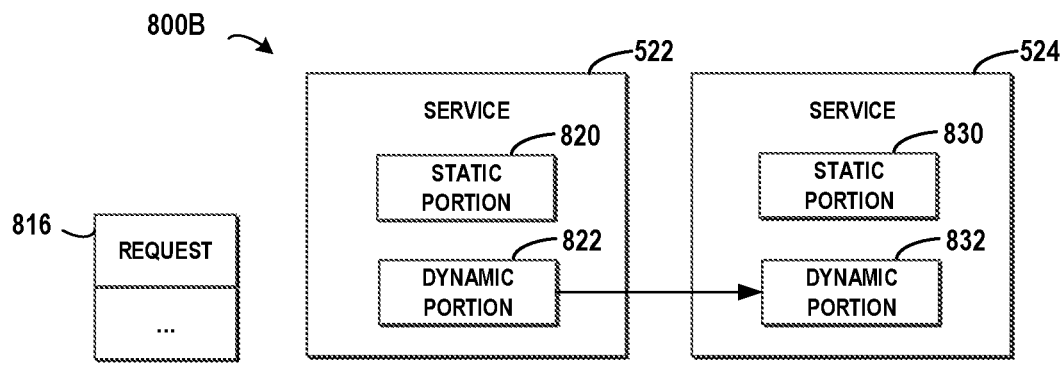
FIG. 8B depicts a diagram for migrating a dynamic portion of a service launched in a first container instance to a second container instance according to one implementation of the present disclosure.

In some implementations of the present disclosure, various types of data associated with the service may be copied to the second container instance at different time points during the migration. For example, first a static portion of the data may be copied to the second container instance, where the static portion stores data that is unchanged when the first group of requests are accessing the service. Then, after the first group of requests have completed accessing the service, a dynamic portion of the data may be copied to the second container instance, where the dynamic portion stores data that is changed when the first group of requests are accessing the service. Reference will be made to FIGS. 8A and 8B for the detailed copy procedure.

In the context of the present disclosure, the static portion may refer to the static resources that are unchanged during the running of the service. The static resource may include codes and data that are associated with the service. Here, the codes may include program codes such as the application binary of the service. The data that is associated with the service may include constants that are utilized by the service, and other unchanged data. Compared with the static portion, the dynamic portion may include data that may be changed during the running of the service. Here, the dynamic portion may include variables that are utilized by the service, stacks of the function/procedure of the service and other data that may be changed during the running of the service. The dynamic portion may change when the first group of requests are accessing the service, and thus it should be copied after the first group of requests have finished accessing the service.

FIG. 8A depicts a diagram 800A for migrating a static portion of a service launched in a first container instance to a second container instance according to one implementation of the present disclosure. In this figure, the service 522 includes a static portion 820 and a dynamic portion 822. The requests 812 and 814 illustrated in shadow blocks indicate the requests in the first group. When the requests 812 and 814 are accessing the service 522, the static portion 820 remains unchanged all the time and thus may be copied to the migrated service 524 to form the static portion 830. However, as the requests 812 and 814 may possibly modify the dynamic portion 822, the dynamic portion 822 should be copied to the migrated service 524 after the requests 812 and 814 have been finished.

FIG. 8B depicts a diagram 800B for migrating a dynamic portion of a service launched in a first container instance to a second container instance according to one implementation of the present disclosure. In FIG. 8B, the requests 812 and 814 have been finished and a final version of the dynamic portion 822 is formed. At this point, the dynamic portion 822 may be copied to the migrated service 524 to form the dynamic portion 832. With the implementation, the service 522 may continue working during most of the time duration when it is being migrated, and the service 522 is shut down only in the time duration when the dynamic portion 822 is copied to the migrated service 524. Usually, the dynamic portion 832 is relatively small and only occupies a small part of the data amount of the service 522, and thus copying the dynamic portion may be performed instantly. Therefore, the shut down time of the service 522 is greatly reduced.

In some implementations of the present disclosure, an access configuration between a respective request in the second group of requests and the service may be determined; and then the second group of requests may be directed to the migrated service based on the access configuration. In order to access a service launched in the container instance, the application should connect to the service via a specific configuration such as a predefined IP address and a port number. Accordingly, the IP address and port number should be recorded and used for directing the suspended requests in the second group to the migrated service.

Referring to FIG. 8A, the access configuration related to the request 816 may be collected. After both the static portion 820 and the dynamic portion 822 of the service 522 are migrated to form the migrated service 524, the request 816 may be directed to the migrated service 524. For example, if the request 816 connects to the service 522 with the IP_address_1 and port_1, then the request 816 may connect to the migrated service 524 with the same IP_address_1 and port_1 after the migration.

Figure 9:
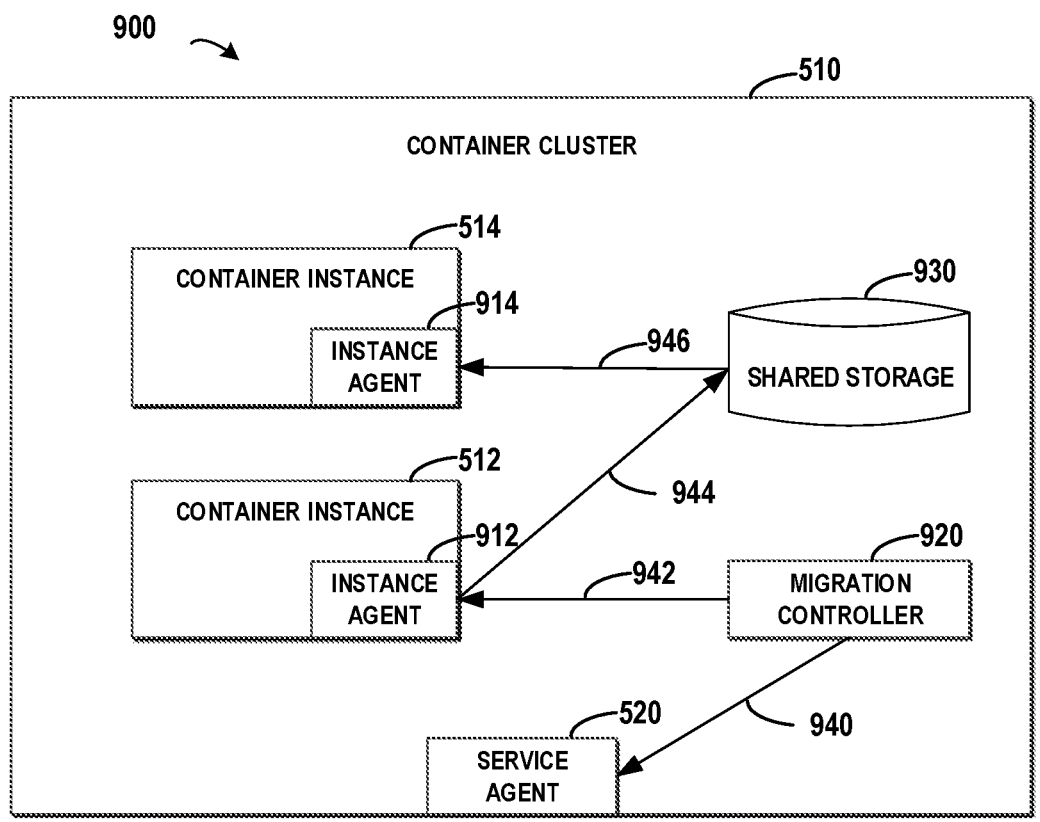
FIG. 9 depicts a diagram of a container cluster for managing a service according to one implementation of the present disclosure.

The above paragraphs describe the service management by taking the method 600 as an example. In order to implement the above method 600, multiple components may be added into the current container cluster 510. FIG. 9 depicts a diagram 900 of a container cluster for managing a service according to one implementation of the present disclosure. The container cluster 510 may include a service agent 520 for obtaining a first group of requests that are accessing a service launched in a first container instance and a second group of requests that are waiting for accessing the service. In each of the container instance, there may be deployed an instance agent for collecting information of the service that are launched and running in the container instance. For example, an instance agent 914 is deployed in the container instance 514, and an instance agent 912 may be deployed in the container instance 512.

A shared storage 930 may be deployed in the container cluster 510 for facilitating in copying the to-be-migrated service. Further, a migration controller 920 may be deployed for monitoring the state of the container instances and decide details of the migration. In one implementation, when the migration controller 920 determines that the workload of the container instance 512 is above the threshold, the service launched in the container instance 512 may be migrated to the container instance 514. In another implementation, when the migration controller 920 receives a migration command, the service may be migrated according to the migration command.

In some implementations of the present disclosure, the data may be mirrored from the first container instance to the second container instance via a storage shared by the first and second container instances. Referring to FIG. 9, the shared storage 930 may be used as an intermediate storage for mirroring the data associated with the service from the container instance 512 to the container instance 514. Continuing the above example of FIGS. 8A and 8B, first the static portion 820 may be mirrored from the service 522 to the migrated service 524; and then the dynamic portion 822 may be mirrored from the service 522 to the migrated service 524. In another implementation, the data associated with the to-be-migrated service may be copied from one container instance to another by other manners.

With the implementations of the present disclosure, as the service agent is deployed independent from the container instance, the service agent may continuously maintain the information of the first and second groups of requests even during the service migration. During the service migration, if a further request is issued by a further application for accessing the service; then the received further request may be added into the second group of requests. At this point, from the perspective of the applications, the service launched in the container instance is always available for being accessed, and the users of the applications may not perceive the migration of the service.

FIG. 9 shows a procedure for managing the service, when the arrows indicate the interactions between the components in the container cluster 510. As indicated by an arrow 940, the migration controller 920 may query the service agent 520 for a first group of requests that are accessing a service launched in a first container instance and a second group of requests that are waiting for accessing the service. Then, the migration controller 920 may notify 942 the container instance 512 to migrate the service to the container instance 514. Next, the container instance 512 may start to migrate the service by copying the data associated with the service via the shared storage 930 to the container instance 514. Specifically, first the data may be copied 944 from the container instance 512 into the shared storage 930, and then the copied data may be obtained 946 from the shared storage 930 to the container instance 514. At this point, the service migration may be completed.

It is to be understood that container cluster 510 in FIG. 9 is only an example implementation of the present disclosure. Based on a specific environment of the implementation, the container cluster 510 may include more or less components. For example, the functions of the service agent 520 and migration controller 920 may be achieved by one single component, or the functions may be achieved by other components that are deployed at another location. Alternatively, the data associated with the service may be directed copied without the shared storage 930 as an intermediate storage.

In some implementations of the present disclosure, during the service migration, if the states of the requests change, the content of the first and second groups may be modified accordingly. Specifically, if a given request in the second group of requests has started to access the migrated service in the second container instance, then it may be removed from the second group of requests and added into a further first group of requests. In this implementation, the requests in the first and second groups may be updated in real time according to the latest states of the requests.

The above method may be implemented during the operation of the container cluster 410. For example, the above method may be implemented again after the service 522 is migrated from the container instance 512 to the container instance 514 to generate the migrated service 524. At this point, the requests in the second group may start to access the migrated service 524, and thus a further first group may be generated to record information about request that is accessing the migrated service 524. If new requests are received and the new requests have to wait for accessing the migrated service 524, the new requests may be added into a further second group. Then, the above method may be implemented with respect to the migrated service 524.

In some implementations of the present disclosure, the state of the service may be recorded for example in the service agent 520. The service agent 520 may obtain the first and second groups of requests, where the obtained groups of requests may be utilized in case of a service migration is triggered. If the service migration is not triggered in the container cluster 510, the container cluster 510 may work in a normal mode; else if the service migration is triggered, then the components in the contain cluster 510 may implement the method as described in the present disclosure.

With the proposed implementations, once a service launched in the container instance, this service is always available for being accessed from the perspective of the applications. Therefore, the disclosed implementations may provide a method for migrating the service lively with a reduced shut down time.

According to one implementation of the present disclosure, a computer-implemented method is disclosed. According to the method, a first group of requests that are accessing a service launched in a first container instance and a second group of requests that are waiting for access the service are obtained. A migrated service in a second container instance is generated by migrating the service from the first container instance to the second container instance based on the obtained first and second groups of requests. The second group of requests is directed to the migrated service in the second container instance.

According to one implementation of the present disclosure, a computing system is disclosed. The computing system comprises a computer processor coupled to a computer-readable memory unit, where the memory unit comprises instructions that when executed by the computer processor implements a method. According to the method, a first group of requests that are accessing a service launched in a first container instance and a second group of requests that are waiting for access the service are obtained. A migrated service in a second container instance is generated by migrating the service from the first container instance to the second container instance based on the obtained first and second groups of requests. The second group of requests is directed to the migrated service in the second container instance.

According to one implementation of the present disclosure, a computer program product is disclosed. The computer program product is tangibly stored on a non-transient machine-readable medium and comprising machine-executable instructions. When the instructions are executed on an electronic device, the electronic device is caused to: obtain a first group of requests that are accessing a service launched in a first container instance and a second group of requests that are waiting for accessing the service; generate a migrated service in a second container instance by migrating the service from the first container instance to the second container instance based on the obtained first and second groups of requests; and direct the second group of requests to the migrated service in the second container instance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for migrating a service from one container to another container in a cloud environment, the method comprising:
concurrently obtaining a first group of requests that are accessing a service launched in a first container instance and a second group of requests that are waiting for accessing the service;
generating a migrated service in a second container instance by migrating the service from the first container instance to the second container instance based on the obtained first and second groups of requests,
wherein the data associated with the migrated service is copied from the first container instance to the second container instance without suspending the first group of requests; and
directing the second group of requests to the migrated service in the second container instance without a new request,
wherein the migrated service remains active and the first group of requests accesses the migrated service during the service migration into the second container instance,
wherein the migrated service includes one or more network activities and one or more computing activities,
wherein the container cluster provides the migrated service without interruption to a consumer and without a change to one or more existing connections to the migrated service and at a reduced shut down time for the migrated service,
wherein the migrated service is shut down for a dynamic portion to be copied to the migrated service,
wherein the data associated with the migrated service is removed from the first container instance with the migrated service is completed.

2. The method of claim 1, further comprising:
suspending the second group of requests.

3. The method of claim 2, wherein the copying data associated with the service, further comprises:
copying a static portion of the data to the second container instance, the static portion storing data that is unchanged when the first group of requests are accessing the service; and
copying a dynamic portion of the data to the second container instance, the dynamic portion storing data that is changed when the first group of requests are accessing the service in response to the first group of requests having completed accessing the service.

4. The method of claim 2, wherein the copying data associated with the service, further comprises:
mirroring the data from the first container instance to the second container instance via a storage shared by the first and second container instances.

5. The method of claim 1, further comprising:
receiving a further request that requests to access the service; and
adding the received further request into the second group of requests.

6. The method of claim 1, wherein obtaining the first and second groups of requests, further comprises:
    obtaining the first and second groups of requests in response to any of detecting a workload associated with the service being above a threshold, or receiving a migrating command.

7. The method of claim 6, wherein detecting the workload associated with the service, further comprises:
    monitoring a workload of a resource in the first container instance in which the service is launched; and
    monitoring a workload of a resource occupied by the service in the first container instance.

8. The method of claim 1, wherein obtaining the second group of requests, further comprises:
    determining an access configuration between a respective request in the second group of requests and the service; and
    directing the second group of requests, wherein directing the second group of requests to the migrated service based on the access configuration.

9. The method of claim 8, further comprising:
    starting to access the migrated service in the second container instance in response to a given request in the second group of request;
    removing the given request from the second group of requests; and
    adding the given request into a further first group of requests.

10. A computer system for migrating a service from one container to another container in a cloud environment, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    concurrently obtaining a first group of requests that are accessing a service launched in a first container instance and a second group of requests that are waiting for accessing the service;
    generating a migrated service in a second container instance by migrating the service from the first container instance to the second container instance based on the obtained first and second groups of requests,
        wherein the data associated with the migrated service is copied from the first container instance to the second container instance without suspending the first group of requests; and
    directing the second group of requests to the migrated service in the second container instance without a new request,
        wherein the migrated service remains active and the first group of requests accesses the migrated service during the service migration into the second container instance,
            wherein the migrated service includes one or more network activities and one or more computing activities,
            wherein the container cluster provides the migrated service without interruption to a consumer and without a change to one or more existing connections to the migrated service and at a reduced shut down time for the migrated service,
        wherein the migrated service is shut down for a dynamic portion to be copied to the migrated service,
        wherein the data associated with the migrated service is removed from the first container instance with the migrated service is completed.

11. The computer system of claim 10, further comprising:
    suspending the second group of requests.

12. The computer system of claim 11, wherein the copying data associated with the service, further comprises:
    copying a static portion of the data to the second container instance, the static portion storing data that is unchanged when the first group of requests are accessing the service; and
    copying a dynamic portion of the data to the second container instance, the dynamic portion storing data that is changed when the first group of requests are accessing the service in response to the first group of requests having completed accessing the service.

13. The computer system of claim 11, wherein the copying data associated with the service, further comprises:
    mirroring the data from the first container instance to the second container instance via a storage shared by the first and second container instances.

14. The computer system of claim 10, further comprising:
    receiving a further request that requests to access the service; and
    adding the received further request into the second group of requests.

15. The computer system of claim 10, wherein obtaining the first and second groups of requests, further comprises:
    obtaining the first and second groups of requests in response to any of detecting a workload associated with the service being above a threshold, or receiving a migrating command.

16. The computer system of claim 15, wherein detecting the workload associated with the service, further comprises:
    monitoring a workload of a resource in the first container instance in which the service is launched; and
    monitoring a workload of a resource occupied by the service in the first container instance.

17. The computer system of claim 10, wherein obtaining the second group of requests, further comprises:
    determining an access configuration between a respective request in the second group of requests and the service; and
    directing the second group of requests, wherein directing the second group of requests to the migrated service based on the access configuration.

18. The computer system of claim 17, further comprising:
    starting to access the migrated service in the second container instance in response to a given request in the second group of requests;
    removing the given request from the second group of requests; and
    adding the given request into the first group of requests.

19. A computer program product for migrating a service from one container to another container in a cloud environment, comprising:
    one or more computer-readable storage media and program instructions stored on at least one of the one or more tangible storage media, the program instructions executable by a processor to cause the processor to perform a method comprising:
    concurrently obtaining a first group of requests that are accessing a service launched in a first container instance and a second group of requests that are waiting for accessing the service;

generating a migrated service in a second container instance by migrating the service from the first container instance to the second container instance based on the obtained first and second groups of requests,
  wherein the data associated with the migrated service is copied from the first container instance to the second container instance without suspending the first group of requests; and
directing the second group of requests to the migrated service in the second container instance without a new request,
  wherein the migrated service remains active and the first group of requests accesses the migrated service during the service migration into the second container instance,
    wherein the migrated service includes one or more network activities and one or more computing activities,
  wherein the container cluster provides the migrated service without interruption to a consumer and without a change to one or more existing connections to the migrated service and at a reduced shut down time for the migrated service,
  wherein the migrated service is shut down for a dynamic portion to be copied to the migrated service,
  wherein the data associated with the migrated service is removed from the first container instance with the migrated service is completed.

20. The computer program product of claim 19, further comprising:
  suspending the second group of requests.

* * * * *